Figure 5:
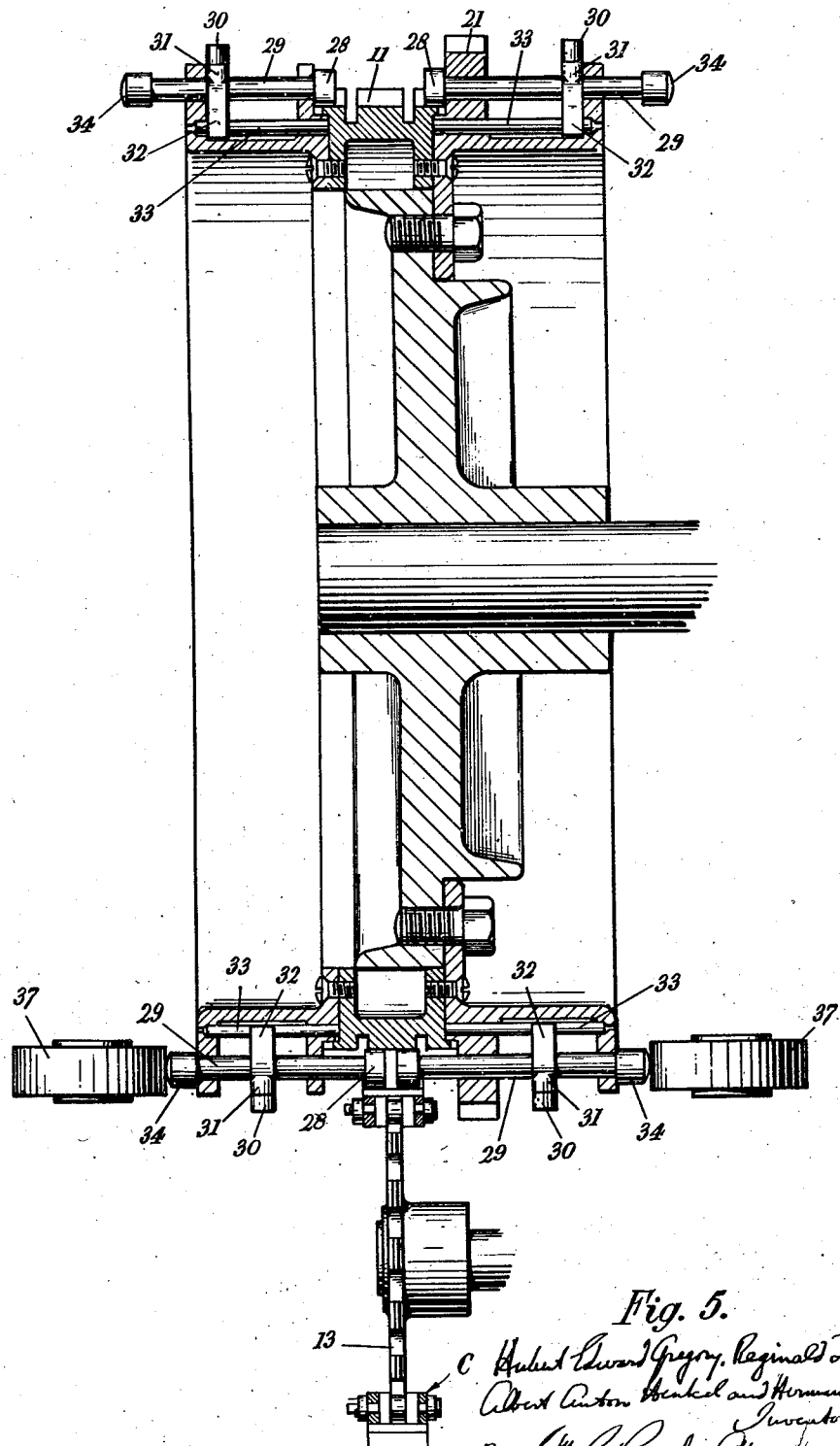

Jan. 30, 1940.  H. E. GREGORY ET AL  2,188,837
MOLDING AND WRAPPING APPARATUS
Filed Dec. 5, 1938   5 Sheets-Sheet 1
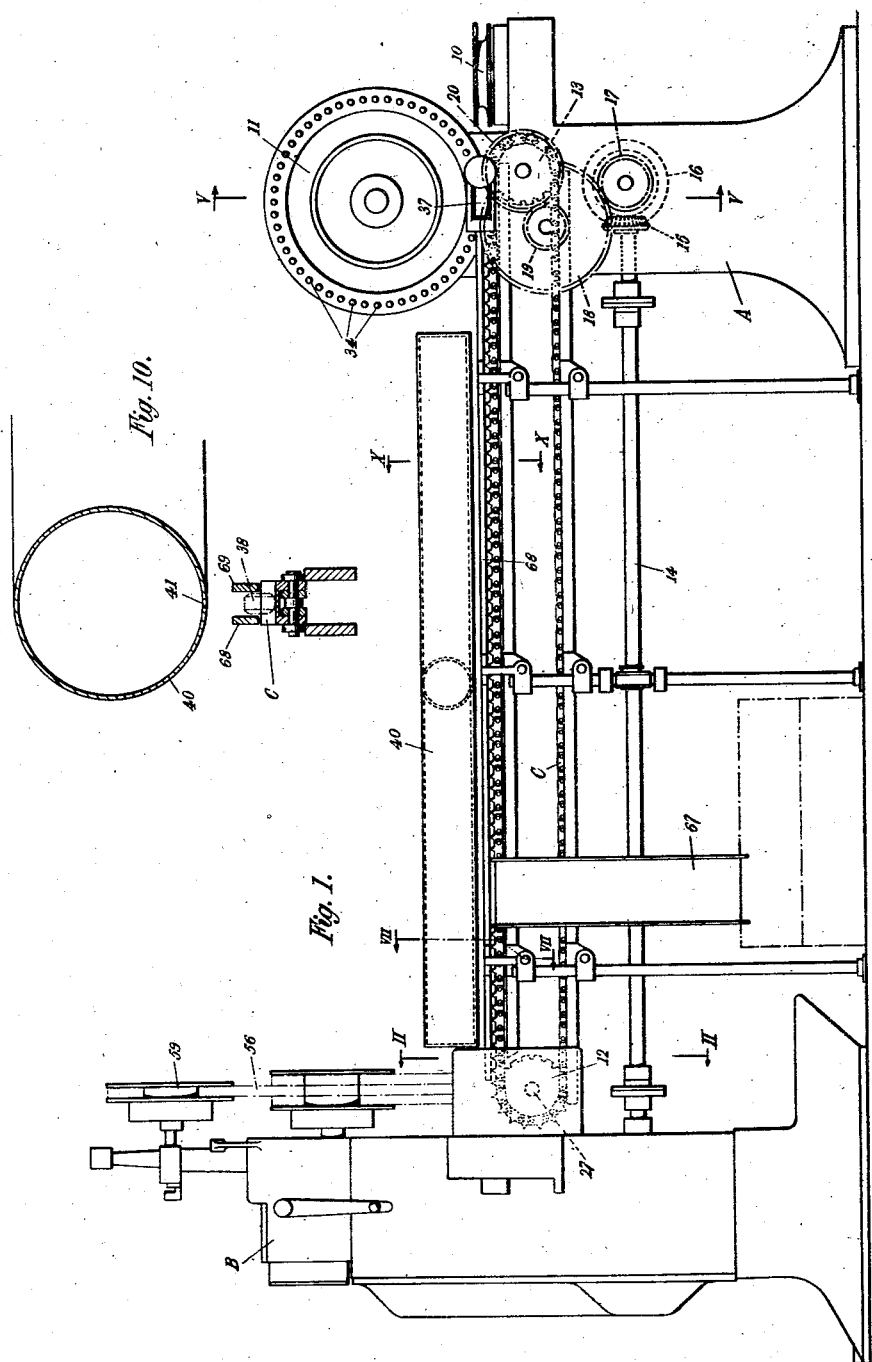

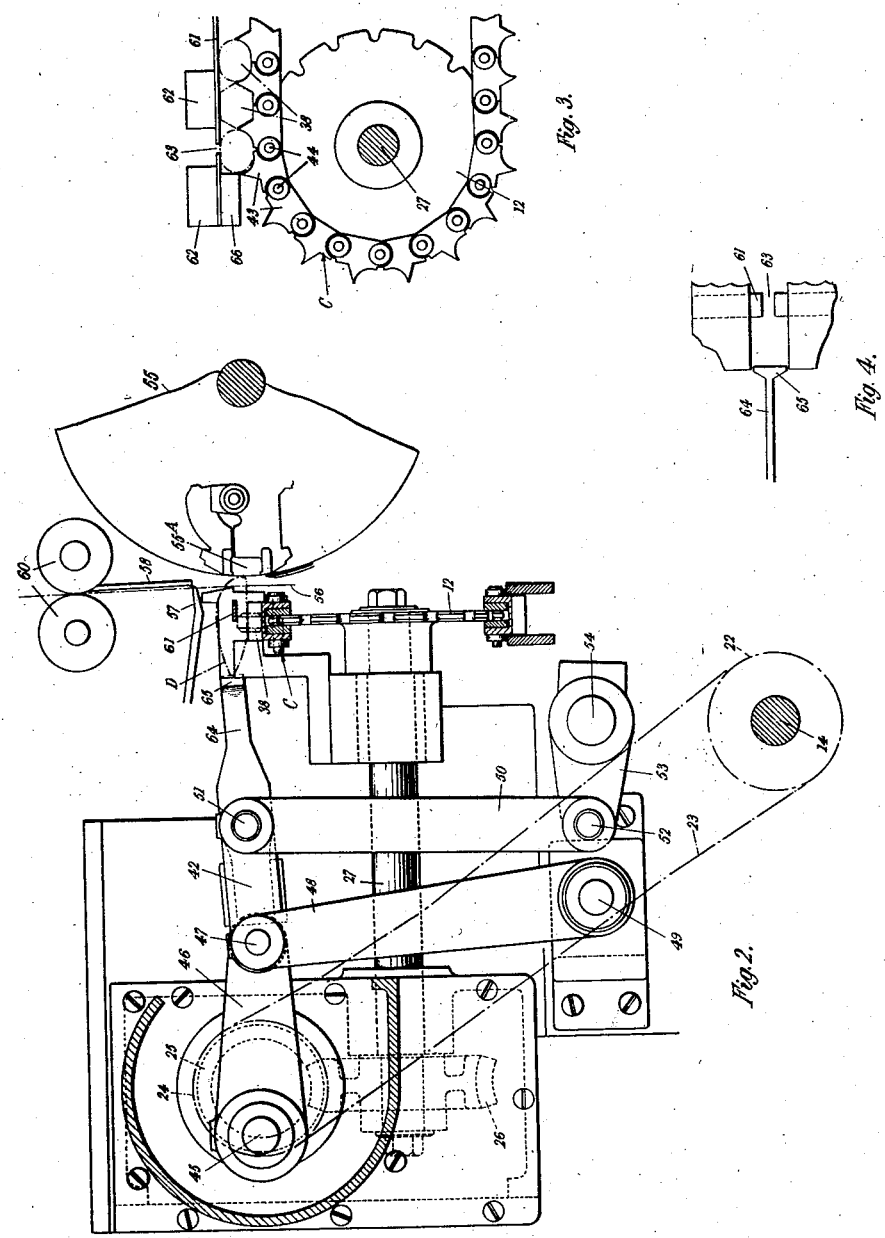

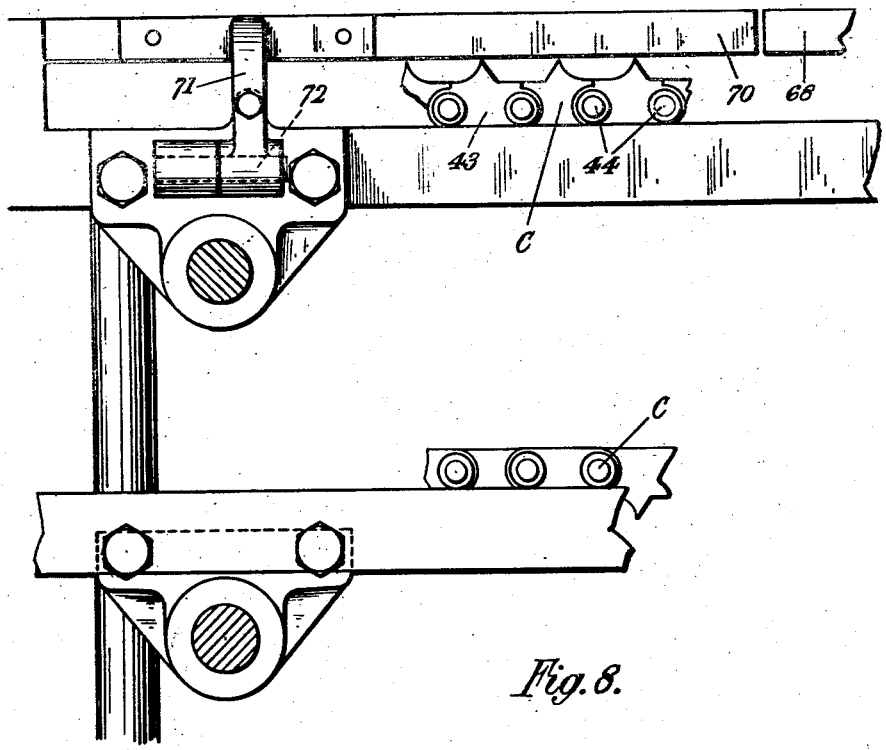
Fig. 8.
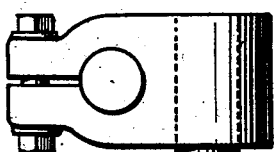
Fig. 9.
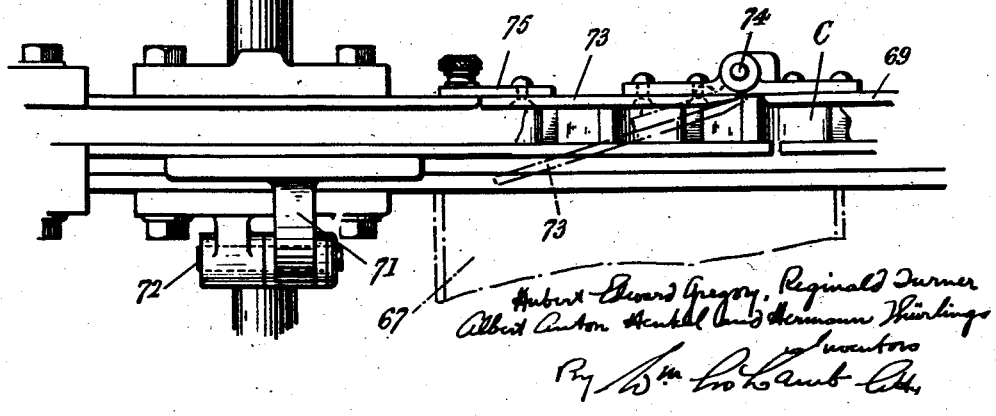

Patented Jan. 30, 1940

2,188,837

UNITED STATES PATENT OFFICE 2,188,837

MOLDING AND WRAPPING APPARATUS

Hubert Edward Gregory and Reginald Turner, Leeds, England, and Albert Anton Henkel and Hermann Thürlings, Viersen, Rhineland, Germany; said Gregory and said Turner assignors to The Forgrove Machinery Company, Limited, Leeds, England, a company of Great Britain Application December 5, 1938, Serial No. 244,106
In Germany December 6, 1937

8 Claims. (Cl. 107—4)

This invention relates to apparatus for molding and wrapping tablets of candy and like plastic materials, of the type comprising a molding device, which molds a rope of candy or like plastic stock into a series of tablets. These tablets may be formed quite separately or alternatively the plastic stock may leave the molding device as a string of formed tablets connected by a relatively thin layer of stock, the joints being subsequently severed to separate the tablets.

It is the object of this invention to provide an apparatus of the above type in which the tablets formed by the molding device can be delivered directly to a wrapping mechanism and wrapped at high speed.

According to the invention, the undersurface of the tablets is shaped by molding cavities in a chain which constitutes part of the molding device, and moves to convey the formed tablets to a wrapping station, at which they are delivered in succession directly from the cavities in the chain to a wrapping mechanism.

The upper surfaces of the tablets may likewise be molded by means of a chain, but it is preferred to employ for this purpose a molding wheel having molding cavities in its periphery which register with those in the chain. If desired, the molding wheel may carry die heads which are moved inwardly by cam action to mold the sides of the tablets.

Means may be provided for cooling the tablets, for example by directing cold air upon them, during their travel from the molding device to the wrapping station. Here they may be delivered in succession to the wrapping mechanism by means of a reciprocating plunger operating in timed relationship with the chain. Where the tablets are joined together in a string, the impact of the plunger will serve to sever the tablet from the string by breaking the thin layer of stock connecting it to its neighbour.

According to a feature of the invention the chain may be supported at its ends on chain wheels which are connected by direct gearing which relieves the chain from driving duties and consequent danger of stretching.

Side guides may be provided which can be moved into position to strip the tablets from the chain before they reach the wrapping station, if it should be desired for any reason to do this.

Figure 7:
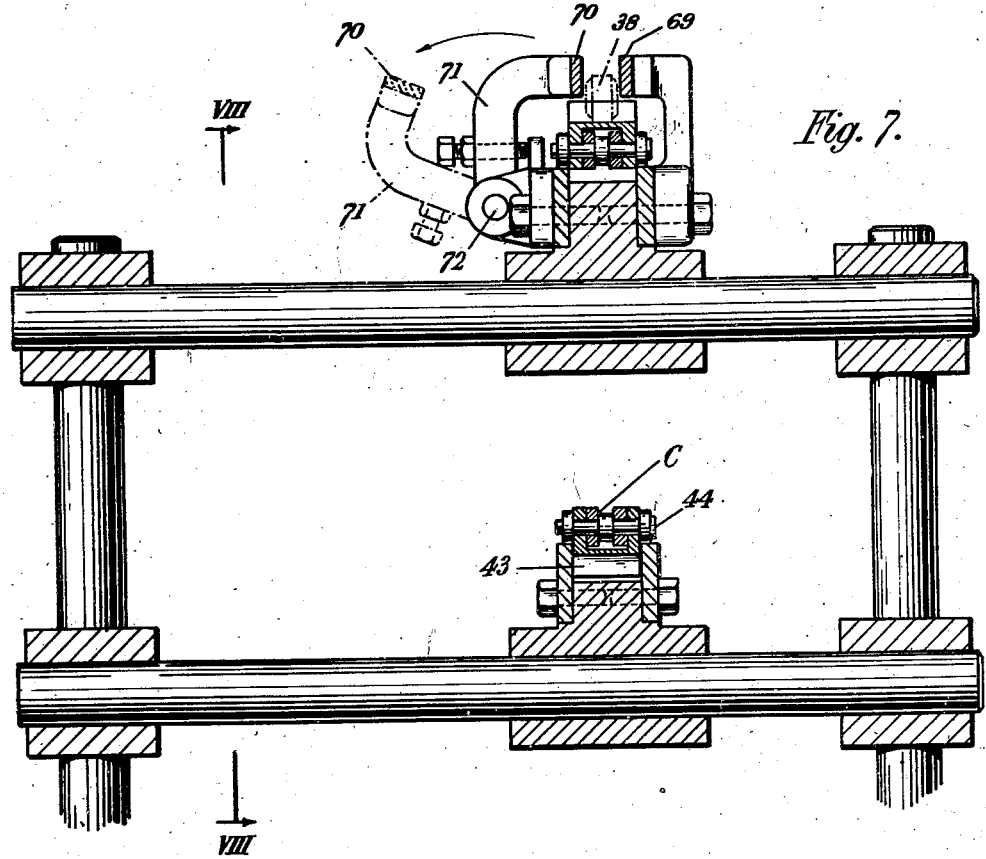
Figure 6:
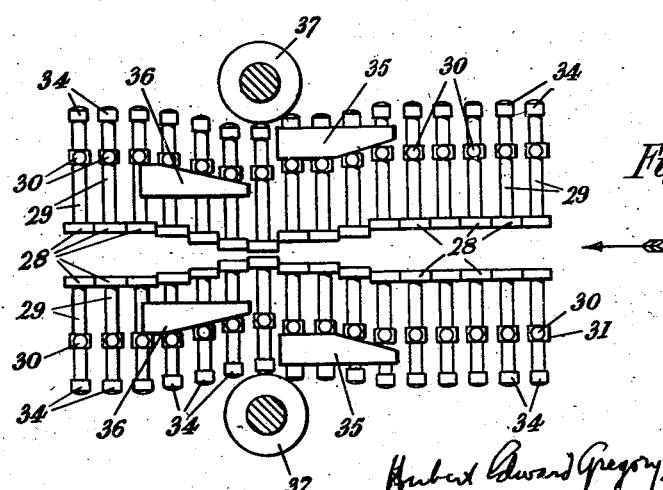

One form of apparatus constructed in accordance with the present invention will now be described in greater detail, by way of example, with reference to the accompanying drawings, in which:

Figure 1 is a side elevation of the apparatus;
Figure 2 is a section taken along the line II—II in Figure 1 on an enlarged scale;
Figure 3 is an elevation of a detail looking from the left hand side of Figure 2;
Figure 4 is a detail plan view of the plunger shown in Figure 2;
Figure 5 is a section, also on an enlarged scale, taken along the line V—V in Figure 1;
Figure 6 is a diagrammatically developed view of the die heads carried by the molding wheel;
Figure 7 is an enlarged sectional view taken along the line VII—VII in Figure 1;
Figure 8 is a section taken along the line VIII—VIII in Figure 7;
Figure 9 is a corresponding plan view; and
Figure 10 is a section taken along the line X—X in Figure 1.

Like references indicate like parts throughout the drawings.

The machine comprises as its essentials a molding device indicated generally by the reference A, a wrapping machine indicated generally by the reference B and an endless conveyor chain C which serves to convey to the wrapping machine tablets molded by the molding device from a rope of candy or like plastic stock. The stock is delivered in a horizontal direction to the molding device by means of a pair of rollers mounted with their axes vertical, one of these rollers being indicated by the reference 10 in Figure 1.

In the molding device the shape of the top of the tablets is determined by a molding wheel 11, whilst the shape of the bottom of the tablets is determined by the upper surface of the endless chain C, which is driven in unison with the molding wheel 11 by positive independent drive of two chain wheels 12, 13. The drive is effected from a main shaft 14, driven by an electric motor, not shown, as follows. At its right hand end the shaft 14 carries a bevel wheel 15 which drives the chain wheel 13 through a chain of gears indicated by the references 16, 17, 18, 19, 20. The molding wheel 11 carries a toothed crown 21 (see Figure 5) which meshes with the gear wheel 18 so that the molding wheel likewise receives its drive from the main shaft 14. The drive of the chain wheel 12 is shown in Figure 2. The shaft 14 carries a sprocket wheel 22 which drives a sprocket wheel 24 through the agency of a chain 23. Mounted on the same shaft as the sprocket wheel 24 is a worm 25 meshing with a worm wheel 26 carried on a spindle 27, on the right hand end of which is mounted the chain wheel 12.

Owing to the fact that the chain wheels 12 and 13 are both positively driven, the conveyor chain C is relieved of driving forces which might result in the chain stretching and causing incorrect meshing of the molding cavities in the chain with those in the molding wheel.

As explained above, the shapes of the top and bottom of the tablets molded from the rope of stock are determined respectively by the molding wheel 11 and the molding cavities in the chain C. The shape of the sides of the tablets is determined by die heads 28 carried by the molding wheel. These die heads are supported on the inner ends of rods 29 slidably mounted in the molding wheel and disposed in pairs around the periphery thereof. The rods 29, located for the time being at the top of the molding wheel, are indicated at the right hand side of the development shown in Figure 6. As the wheel rotates in the direction indicated by the arrow in that figure, the rods are moved inwards by reason of outwardly projecting cam pieces 30 carried by them contacting with stationary cams 35. The die heads carried by the opposed rods are therefore caused to approach one another. As indicated in Figure 5, the cam pieces 30 are carried on members 31 which embrace the rods 29 and are formed at their ends remote from the cam pieces with forks 32 which can slide on fixed bars 33 but prevent rotation of the rods 29 relatively to the molding wheel.

As each pair of rods reaches the molding station, they are forced still further inwards by cooperation of their outer heads 34 with rollers 37, these rollers giving the squeezing movement required to mold the sides of the tablets. On moving away from the molding station again, the die heads 28 are moved apart by reason of the cam pieces 30 on the rods 29 coacting with fixed cams 36. If desired, the rods 29 can be provided with springs tending to hold the die heads apart, the rods being forced in against the action of the springs by the cams 35 and rollers 37.

The result of the operation of the molding device is to form the stock into a series of tablets interconnected by relatively thin layers of stock. These tablets are clearly shown in Figure 3 and are represented throughout the drawings by the reference 38. As will be seen, the tablets are made on edge and are maintained on the horizontal forming chain C in this position. During their travel to the wrapping machine B, the tablets are exposed to a cold air draught delivered from a casing 40 extending above and parallel to the chain and formed with one or more slots 41 in its lower face through which the cold air is directed on to the tablets. Owing to the fact that the tablets are set on edge the cooling air is directed on to the small joints between the tablets, thus cooling them sufficiently to enable the tablets to be readily parted by the action of the plunger 42 of the wrapping machine, as hereinafter described. The fact that the tablets are arranged on edge has the further advantage that a larger area of candy joint is directly exposed for cooling and when the tablet arrives at the delivery end of the chain and the link 43 in which it sits is opened (as indicated in Figure 3), this opening tends to free the tablet and allow the whole action of the plunger to be exerted for severing the narrow connection between it and the following tablet.

As will be observed from Figure 3, the tablets stand out of the chain by an amount corresponding to the depth of the molds in the wheel 11. The chain is constituted by links 43 each of which is pivoted at each end by a pin 44 to the next succeeding link. When the tablets reach the position immediately above the centre of the left hand chain wheel 12 (i. e. that occupied by the left hand tablet 38 shown in Figure 3), the mold begins to open owing to the chain beginning to move around the periphery of the chain wheel, thus freeing the tablet and allowing it to be parted by the reciprocating action of the plunger 42. This action is derived from a crank 45 mounted on the shaft of the sprocket wheel 13 and pivoted by means of a link 46 to a pivot pin 47 carried on the upper end of a link 48, which can rock under the action of the crank about its lower pivot 49. The left hand end of the plunger 42 is pivoted to the pin 47 and the plunger is given an additional up and down movement by means of a link 50 pivoted at its upper end 51 to the plunger and at its lower end 52 to an arm 53 fixed to a spindle 54 which is given a to and fro rocking movement by means, not shown, in timed relationship with the movement of the eccentric. As a result of receiving these two movements the head of the plunger executes the path D represented in chain-dotted lines.

The wrapping machine is of known construction and comprises a pocket wheel 55 having a series of pairs of jaws 55$^{A1}$ which are brought in succession, in the manner customary in such machines, into position opposite the plunger so as to receive the tablets delivered by the action of the plunger from the molding chain C. As each tablet is delivered into the jaws 55$^A$ it carries with it a wrapper 56 cut off by the action of knife blades 57, 58 from a continuous length of wrapper stored on a reel 59 and fed between rollers 60. The pocket wheel 55 rotates intermittently and completes the wrapping of the tablet in known manner.

The tablets are supported during the severing operation by a guide plate 61 carried on brackets 62, from a fixed part of the machine and formed with a slot 63 (see Figure 4), through which the narrow neck 64 of the plunger can pass to permit the plunger to travel in the path D. The plunger head 65 is enlarged to the approximate size of the side of the tablet. The plate 61 extends to the right to about the location of the left hand end of the tube 49.

A stationary abutment 66 is located at the end of the chain in the position where the tablet is freed so that at about the moment when the plunger strikes the tablet to part it from its neighbour, the tablet will be positively stopped by this abutment and will be guided by it after it has been severed and during its passage into the jaws 55$^A$ of the pocket wheel.

If the wrapping mechanism should cease to operate for any reason, it is desirable to be able to slow down the speed of operation of the molding chain and this can readily be done by adjustment of the controls of the electric motor driving the main shaft 14. In this case it is desirable to remove the string of tablets from the chain and deflect it down a side chute indicated at 67 in Figure 1. This can be achieved as follows:

As shown in Figures 7-9, guides 68, 69 extend one on each side of the upper portion of the chain so as to prevent the tablets from moving sideways out of the chain. A section 70 of the guide 68 lying to the left hand thereof carries a bracket 71 pivoted to a horizontal pin 72. This section can be moved by hand about its pivot into the position shown in chain-dotted lines in Figure 7 to allow the material to be delivered down the chute 67. In order to remove the string of tablets from the chain and permit it to fall down into the chute through the space left free by the movement of the guide 70 into the chain-dotted line position in Figure 7, the left hand portion 73 of the guide 69 is pivoted to the remainder of the guide about a vertical pivot 74. It is normally held in alignment with the rest of the guide 69 by means of a catch 75, but on releasing this catch the portion 73 of the guide can be moved into the position shown in chain-dotted lines in Figure 9 in which it lies across the path of the string of tablets and acts to strip the tablets from the chain and deliver them to the chute 67.

What we claim as our invention and desire to secure by Letters Patent is:

1. Apparatus for molding and wrapping confectionery tablets comprising in combination a molding device for forming a succession of tablets from a rope of plastic stock, a wrapping wheel, means for imparting intermittent rotary movement to the wrapping wheel, a conveyor chain constituting an operative element of the molding device and having molding cavities which shape the undersurface of the tablets, said chain extending across a cooling zone between the molding device and the wrapping wheel, means for imparting continuous forward movement to the chain so as to convey the formed tablets from the molding device and through the cooling zone to the wrapping wheel, and means coacting with the chain for transferring the tablets in succession directly from the cavities in the chain to the wrapping wheel, as they are brought opposite the latter by the chain.

2. Apparatus for molding and wrapping confectionery tablets comprising in combination a molding device for forming a succession of tablets from a rope of plastic stock, a wrapping wheel, means for imparting intermittent rotary movement to the wrapping wheel, a conveyor chain constituting an operative element of the molding device and having molding cavities which shape the undersurface of the tablets, said chain extending across a cooling zone between the molding device and the wrapping wheel, a molding wheel which coacts with the chain to shape the upper surfaces of the tablets, means for imparting continuous forward movement to the chain so as to convey the formed tablets from the molding device and through the cooling zone to the wrapping wheel, and means coacting with the chain for transferring the tablets in succession directly from the cavities in the chain to the wrapping wheel, as they are brought opposite the latter by the chain.

3. Apparatus for molding and wrapping confectionery tablets comprising in combination a molding device for forming a succession of tablets from a rope of plastic stock, a wrapping wheel, means for imparting intermittent rotary movement to the wrapping wheel, a conveyor chain constituting an operative element of the molding device and having molding cavities which shape the undersurface of the tablets, said chain extending across a cooling zone between the molding device and the wrapping wheel, means for imparting continuous forward movement to the chain so as to convey the formed tablets from the molding device and through the cooling zone to the wrapping wheel, a device situated in the cooling zone for supplying cooling air to the portion of the chain extending across said cooling zone, and means coacting with the chain for transferring the tablets in succession directly from the cavities in the chain to the wrapping wheel, as they are brought opposite the latter by the chain.

4. Apparatus for molding and wrapping confectionery tablets comprising in combination a molding device for forming a succession of tablets from a rope of plastic stock, a wrapping wheel, means for imparting intermittent rotary movement to the wrapping wheel, a conveyor chain constituting an operative element of the molding device and having molding cavities which shape the undersurface of the tablets, said chain extending across a cooling zone between the molding device and the wrapping wheel, chain wheels supporting the opposite ends of the chain, direct gearing interconnecting the chain wheels, driving means for rotating the chain wheels and thereby imparting continuous forward movement to the chain so as to convey the formed tablets from the molding device and through the cooling zone to the wrapping wheel, and means coacting with the chain for transferring the tablets in succession directly from the cavities in the chain to the wrapping wheel, as they are brought opposite the latter by the chain.

5. Apparatus for molding and wrapping confectionery tablets comprising in combination a molding device for forming a succession of tablets from a rope of plastic stock, a wrapping wheel, means for imparting intermittent rotary movement to the wrapping wheel, a conveyor chain constituting an operative element of the molding device and having molding cavities which shape the undersurface of the tablets, said chain extending across a cooling zone between the molding device and the wrapping wheel, means for imparting continuous forward movement to the chain so as to convey the formed tablets from the molding device and through the cooling zone to the wrapping wheel, side guides mounted alongside the chain and movable into position to strip the tablets from the chain before they reach the wrapping wheel, and means coacting with the chain for transferring the tablets in succession directly from the cavities in the chain to the wrapping wheel, as they are brought opposite the latter by the chain.

6. Apparatus as claimed in claim 5, in which the side guides include displaceable sections, one of which is movable to provide a discharge space permitting of the sideways discharge of the tablets from the chain, and the other of which is movable across the path of the tablets for the purpose of diverting them through said discharge space.

7. Apparatus for molding and wrapping confectionery tablets comprising in combination a molding device for forming a succession of tablets from a rope of plastic stock, a wrapping wheel, means for imparting intermittent rotary movement to the wrapping wheel, a conveyor chain constituting an operative element of the molding device and having molding cavities which shape the undersurface of the tablets, said chain extending across a cooling zone between the molding device and the wrapping wheel, chain wheels supporting the opposite ends of the chain, means for imparting continuous forward movement to the chain so as to convey the formed tablets from the molding device and through the cooling zone to the wrapping wheel, a reciprocating plunger coacting on its forward stroke with the chain as it passes over the chain wheel remote from the molding device to transfer the tablets in succession directly to the wrapping wheel from the cavities in the chain, as they are opened by the passage of the chain over the chain wheel, and means for lifting the plunger clear of the chain on its return stroke.

8. Apparatus as claimed in claim 7, having a guide plate located above the chain for supporting the tablets during the transfer operation and in which the plunger is formed with a narrow neck to enable it to rise through a slot in said guide plate prior to its return stroke.

HUBERT EDWARD GREGORY.
REGINALD TURNER.
ALBERT ANTON HENKEL.
HERMANN THÜRLINGS.